United States Patent
Yoshikawa et al.

(10) Patent No.: US 7,928,179 B2
(45) Date of Patent: Apr. 19, 2011

(54) PHOTOREACTIVE GROUP-CONTAINING SILOXANE COMPOUND, MAKING METHOD, PHOTO-CURABLE RESIN COMPOSITION, AND ARTICLE HAVING COATING THEREOF

(75) Inventors: Yuji Yoshikawa, Annaka (JP); Masaaki Yamaya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 991 days.

(21) Appl. No.: 11/785,379

(22) Filed: Apr. 17, 2007

(65) Prior Publication Data
US 2007/0244250 A1 Oct. 18, 2007

(30) Foreign Application Priority Data

Apr. 18, 2006 (JP) ................. 2006-114074
Jul. 13, 2006 (JP) ................. 2006-192436

(51) Int. Cl.
*C08G 77/20* (2006.01)

(52) U.S. Cl. .............. 528/34; 524/379; 528/21; 528/32; 526/279; 428/447

(58) Field of Classification Search ........................ None
See application file for complete search history.

(56) References Cited

U.S. PATENT DOCUMENTS

| 4,290,869 | A | * | 9/1981 | Pigeon ........................... 428/438 |
| 4,902,739 | A | * | 2/1990 | Ona et al. ....................... 524/588 |
| 5,188,864 | A | * | 2/1993 | Lee et al. ....................... 427/515 |
| 5,663,269 | A | * | 9/1997 | Chu et al. ........................ 528/14 |
| 6,018,011 | A | * | 1/2000 | Scheim et al. .................. 528/34 |
| 6,121,342 | A | * | 9/2000 | Suzuki et al. ................. 522/148 |
| 6,329,490 | B1 | | 12/2001 | Yamashita et al. |
| 6,437,042 | B2 | * | 8/2002 | Kobayashi et al. ........... 524/837 |

FOREIGN PATENT DOCUMENTS

| JP | 48-47997 | A | * | 9/1977 |
| JP | 2002-363414 | A | | 12/2002 |
| JP | 2004-143449 | A | | 5/2004 |
| JP | 3572989 | B2 | | 7/2004 |
| JP | 3603133 | B2 | | 10/2004 |

OTHER PUBLICATIONS

Written translation of JP 48-47997 (1977).*

* cited by examiner

*Primary Examiner* — Marc S Zimmer
(74) *Attorney, Agent, or Firm* — Birch, Stewart, Kolasch & Birch, LLP

(57) ABSTRACT

A photoreactive group-containing siloxane compound is obtained by subjecting a system comprising (a) a photoreactive group-containing alkoxysilane and (b) a hydrolyzable group end-capped dimethylsiloxane to hydrolytic condensation in the presence of a basic catalyst and with an amount of water greater than the amount necessary for hydrolytic condensation of all alkoxy groups. It forms on a substrate a coating having mar resistance, crack resistance, anti-staining effect, and marker ink wipe-off ability.

19 Claims, No Drawings

PHOTOREACTIVE GROUP-CONTAINING SILOXANE COMPOUND, MAKING METHOD, PHOTO-CURABLE RESIN COMPOSITION, AND ARTICLE HAVING COATING THEREOF

CROSS-REFERENCE TO RELATED APPLICATION

This non-provisional application claims priority under 35 U.S.C. §119(a) on Patent Application Nos. 2006-114074 and 2006-192436 filed in Japan on Apr. 18, 2006 and Jul. 13, 2006, respectively, the entire contents of which are hereby incorporated by reference.

TECHNICAL FIELD

This invention relates to a novel photoreactive group-containing siloxane compound, a method for preparing the compound, a photo-curable resin composition for use as coating compositions, and an article having a cured coating thereof. More particularly, it relates to a photo-curable resin composition meeting both the contradictory features of high hardness and crack resistance and having improved stain resistance.

BACKGROUND ART

Synthetic resins such as polymethyl methacrylate resins, polycarbonate resins, polystyrene resins, cyclic polyolefin resins, polyethylene terephthalate resins, and triacetyl cellulose resins have many advantages including light weight, transparency and ease of working. These synthetic resins are currently utilized in a variety of fields including optical disks such as CD and DVD, display windows such as liquid crystal displays and EL panels, and functional films.

On use, resin surfaces are often stained with various contaminants and smudged with fingerprints. Such stains and fingerprint smudges are undesirable. For some optical data media, appropriate surface treatment is carried out for the purposes of improving stain resistance, reducing fingerprint adhesion, and facilitating fingerprint removal. For example, various water- and oil-repellent treatments on the surface of optical data media are contemplated.

One common practice for improving the mar resistance of such surface is by forming a transparent hard coat having mar resistance on the incident surface of optical media where writing and/or reading beam enters. Hard coats are formed by coating a composition on the medium surface and irradiating the coating with actinic energy radiation such as UV for curing the coating, the composition comprising a compound having at least two photoreactive groups such as (meth)acryloyl groups in a molecule, a siloxane compound of cage structure obtained through hydrolytic condensation of an alkoxysilane having photoreactive groups such as (meth)acryloyl groups in the presence of a basic catalyst (see JP-A 2002-363414 and JP-A 2004-143449), or the reaction product of an alkoxysilane having photoreactive groups with colloidal silica or the like. However, since these hard coats are intended solely for improving mar resistance, their crack resistance is poor and the anti-staining effect with respect to fingerprint smudges and contaminants and the ability to wipe off marker ink are not expectable.

Then Japanese Patent Nos. 3,603,133 and 3,572,989 disclose a siloxane compound of cage structure obtained by hydrolytic condensation of an alkoxysilane having a polymerizable functional group and an alkoxysilane having a perfluoroalkyl group in the presence of a basic catalyst. A composition comprising such a siloxane compound is coated and cured into a coating, which is expected to have improved anti-staining property because of an increased contact angle with oleic acid, but is insufficient in marker ink wipe-off and substantially reduced in abrasion resistance.

DISCLOSURE OF THE INVENTION

An object of the invention is to provide a photoreactive group-containing siloxane compound capable of imparting mar resistance, crack resistance, an anti-staining effect with respect to fingerprints and contaminants, and a marker ink wipe-off ability to a support substrate; a method for preparing the compound; a photo-curable resin composition; and an article having a cured coating thereof.

The inventor has found that a photoreactive group-containing siloxane compound is obtained by subjecting a system comprising (a) a photoreactive group-containing alkoxysilane selected from photoreactive group-containing alkoxysilanes having the general formulae (1) to (5) and mixtures thereof, with the proviso that if component (a) is a single alkoxysilane, it is a trialkoxysilane, and if component (a) is a mixture of alkoxysilanes, it contains at least 70 mol % of a trialkoxysilane, (b) a hydrolyzable group end-capped dimethylsiloxane having the general formula (6), (d) an alcohol, and optionally (c) another alkoxysilane having the general formula (7) to hydrolytic condensation in the presence of a basic catalyst and with an amount of water greater than the amount necessary for hydrolytic condensation of all alkoxy groups, neutralizing the resulting system, and distilling off the alcohol; and that the photoreactive group-containing siloxane compound thus obtained is effective for imparting mar resistance, crack resistance, an anti-staining effect with respect to fingerprints and contaminants, and a marker ink wipe-off ability.

Accordingly, the present invention provides a photoreactive group-containing siloxane compound, a method for preparing the compound; a photo-curable resin composition; and an article having a cured coating thereof.

In a first aspect, the invention provides a photoreactive group-containing siloxane compound which is obtained through hydrolytic condensation of a system comprising (a) a photoreactive group-containing alkoxysilane selected from photoreactive group-containing alkoxysilanes having the following general formulae (1) to (5):

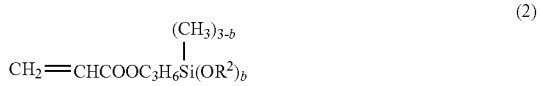

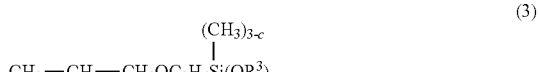

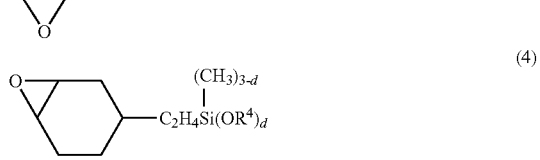

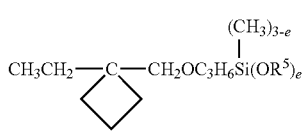

(5)

wherein each of $R^1$ to $R^5$ is an alkyl group of 1 to 4 carbon atoms or acetyl group, each of a, b, c, d, and e is an integer of 1 to 3, and mixtures thereof, with the proviso that if component (a) is a single alkoxysilane, it is a trialkoxysilane, and if component (a) is a mixture of alkoxysilanes, it contains at least 70 mol % of a trialkoxysilane, and (b) a hydrolyzable group end-capped dimethylsiloxane having the general formula (6):

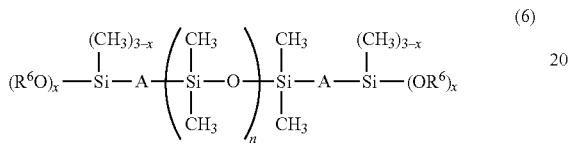

(6)

wherein $R^6$ is hydrogen, methyl or ethyl, A is an oxygen atom or ethylene, n is an integer of 5 to 100, and x is an integer of 1 to 3,
in the presence of a basic catalyst and with an amount of water greater than the amount necessary for hydrolytic condensation of all alkoxy groups.

In a preferred embodiment, the system further comprises (c) another alkoxysilane having the general formula (7):

$$R^7_f Si(OR^8)_{4-f}$$ (7)

wherein $R^7$ is an alkyl group of 1 to 10 carbon atoms, cyclohexyl, phenyl, a perfluoroalkyl-containing organic group of 1 to 20 carbon atoms, or a hexafluoropropene oxide-containing organic group, $R^8$ is an alkyl group of 1 to 4 carbon atoms or acetyl group, and f is an integer of 0 to 3.

Typically, component (a) is $CH_2=CHCOOC_3H_6Si(OCH_3)_3$ or a silane of the formula:

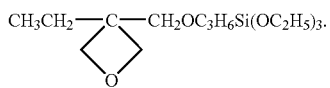

Preferably, component (b) is a trimethoxy end-capped dimethylsiloxane of the formula:

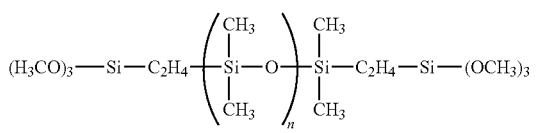

wherein n is an integer of 5 to 100. Typically, the basic catalyst is a tetraalkylammonium hydroxide.

Preferably, the photoreactive group-containing siloxane compound has a weight average molecular weight equal to or less than 5,000 and a silanol content equal to or less than 2% by weight.

In a second aspect, the invention provides a method for preparing a photoreactive group-containing siloxane compound, comprising the steps of subjecting a system comprising (a) a photoreactive group-containing alkoxysilane selected from photoreactive group-containing alkoxysilanes having the following general formulae (1) to (5):

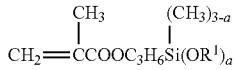

(1)

(2)

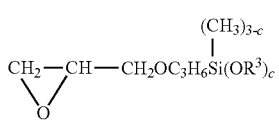

(3)

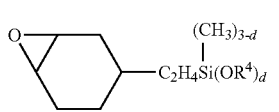

(4)

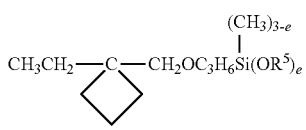

(5)

wherein each of $R^1$ to $R^5$ is an alkyl group of 1 to 4 carbon atoms or acetyl group, each of a, b, c, d, and e is an integer of 1 to 3, and mixtures thereof, with the proviso that if component (a) is a single alkoxysilane, it is a trialkoxysilane, and if component (a) is a mixture of alkoxysilanes, it contains at least 70 mol % of a trialkoxysilane, (b) a hydrolyzable group end-capped dimethylsiloxane having the general formula (6):

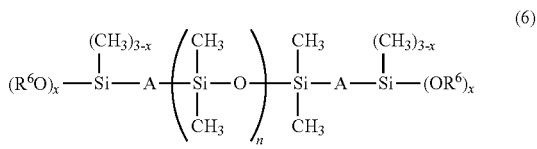

(6)

wherein $R^6$ is hydrogen, methyl or ethyl, A is an oxygen atom or ethylene, n is an integer of 5 to 100, and x is an integer of 1 to 3, and (d) an alcohol
to hydrolytic condensation in the presence of a basic catalyst and with an amount of water greater than the amount necessary for hydrolytic condensation of all alkoxy groups, rendering the resulting system neutral, and distilling off the alcohol.

In a preferred embodiment, the system further comprises (c) another alkoxysilane having the general formula (7):

$$R^7_f Si(OR^8)_{4-f}$$ (7)

wherein $R^7$, $R^8$, and f are as defined above.

Typically, component (a) is $CH_2=CHCOOC_3H_6Si(OCH_3)_3$ or a silane of the formula:

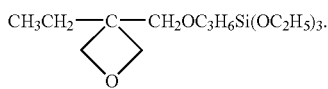

Also typically, the basic catalyst is a tetraalkylammonium hydroxide.

In a third aspect, the invention provides a photo-curable resin composition comprising the photoreactive group-containing siloxane compound defined above and a curing catalyst.

In a fourth aspect, the invention provides an article comprising a cured coating of the photo-curable resin composition.

BENEFITS OF THE INVENTION

The photoreactive group-containing siloxane compound of the invention has advantages that a coating thereof is improved in crack resistance and anti-staining property because a dimethylsiloxane component is incorporated in its structure, and has sufficient abrasion resistance because the dimethylsiloxane component is firmly bound within the structure by hydrolyzable groups at both ends.

DESCRIPTION OF THE PREFERRED EMBODIMENT

The photoreactive group-containing siloxane compound of the invention is obtained by subjecting a system comprising (a) a photoreactive group-containing alkoxysilane selected from photoreactive group-containing alkoxysilanes having the general formulae (1) to (5) and mixtures thereof, with the proviso that if component (a) is a single alkoxysilane, it is a trialkoxysilane, and if component (a) is a mixture of alkoxysilanes, it contains at least 70 mol % of a trialkoxysilane, (b) a hydrolyzable group end-capped dimethylsiloxane having the general formula (6), (d) an alcohol, and optionally, (c) another alkoxysilane having the general formula (7) to hydrolytic condensation in the presence of a basic catalyst and with an amount of water greater than the amount necessary for hydrolytic condensation of all alkoxy groups, rendering the resulting system neutral, and distilling off the alcohol and the like.

(a) Photoreactive Group-Containing Alkoxysilane

The photoreactive group-containing alkoxysilane used herein is selected from alkoxysilanes having the general formulae (1) to (5) and mixtures thereof.

$$CH_2\!=\!\underset{\underset{CH_3}{|}}{C}COOC_3H_6Si(OR^1)_a{}^{(CH_3)_{3-a}} \tag{1}$$

$$CH_2\!=\!CHCOOC_3H_6Si(OR^2)_b{}^{(CH_3)_{3-b}} \tag{2}$$

$$\underset{O}{CH_2\!-\!CH}\!-\!CH_2OC_3H_6Si(OR^3)_c{}^{(CH_3)_{3-c}} \tag{3}$$

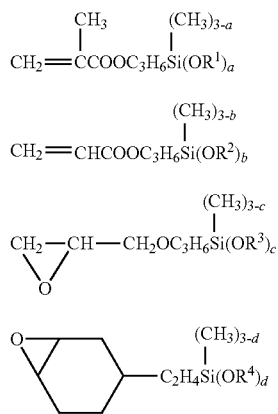
(4)

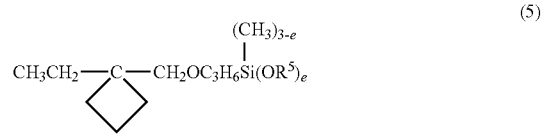

Herein each of $R^1$ to $R^5$ is an alkyl group of 1 to 4 carbon atoms or an acetyl group, each of a, b, c, d, and e is an integer of 1 to 3.

Specifically, $R^1$ to $R^5$ stand for alkyl groups of 1 to 4 carbon atoms such as methyl, ethyl, n-propyl, isopropyl, n-butyl, isobutyl, tert-butyl, or acetyl groups, with methyl and ethyl being preferred.

Where only one photoreactive group-containing alkoxysilane is used, a trialkoxysilane should be used. Where a mixture of two or more photoreactive group-containing alkoxysilanes is used, it should contain at least 70 mol %, preferably at least 75 mol % of a trialkoxysilane. On use of only one compound, it is a trialkoxysilane for the reason that if it is entirely composed of a monoalkoxysilane or dialkoxysilane, then it is less curable and fails to form a coating having improved abrasion resistance, and that if it is entirely composed of a tetraalkoxysilane, then gelation occurs during synthesis. A mixture of two or more alkoxysilanes, when used, should contain at least 70 mol % of a trialkoxysilane for the following reason. If more monoalkoxysilane or dialkoxysilane is used, then a coating having improved abrasion resistance is not available. If more tetraalkoxysilane is used, cracks are more likely to occur. Even on combined use of such silanes, it is difficult to achieve a balance of the desired features.

Examples of the alkoxysilane (a) are given below.

$CH_2\!=\!C(CH_3)COOC_3H_6Si(OCH_3)_3$, $CH_2\!=\!C(CH_3)COOC_3H_6Si(OC_2H_5)_3$, $CH_2\!=\!C(CH_3)COOC_3H_6SiCH_3(OCH_3)_2$, $CH_2\!=\!C(CH_3)COOC_3H_6SiCH_3(OC_2H_5)_2$, $CH_2\!=\!C(CH_3)COOC_3H_6Si(CH_3)_2OCH_3$, $CH_2\!=\!C(CH_3)COOC_3H_6Si(CH_3)_2OC_2H_5$, $CH_2\!=\!CHCOOC_3H_6Si(OCH_3)_3$, $CH_2\!=\!CHCOOC_3H_6Si(OC_2H_5)_3$, $CH_2\!=\!CHCOOC_3H_6SiCH_3(OCH_3)_2$, $CH_2\!=\!CHCOOC_3H_6SiCH_3(OC_2H_5)_2$, $CH_2\!=\!CHCOOC_3H_6Si(CH_3)_2OCH_3$, $CH_2\!=\!CHCOOC_3H_6Si(CH_3)_2OC_2H_5$,

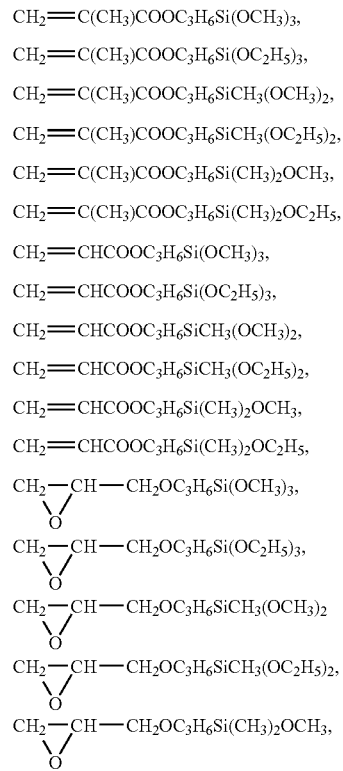

-continued

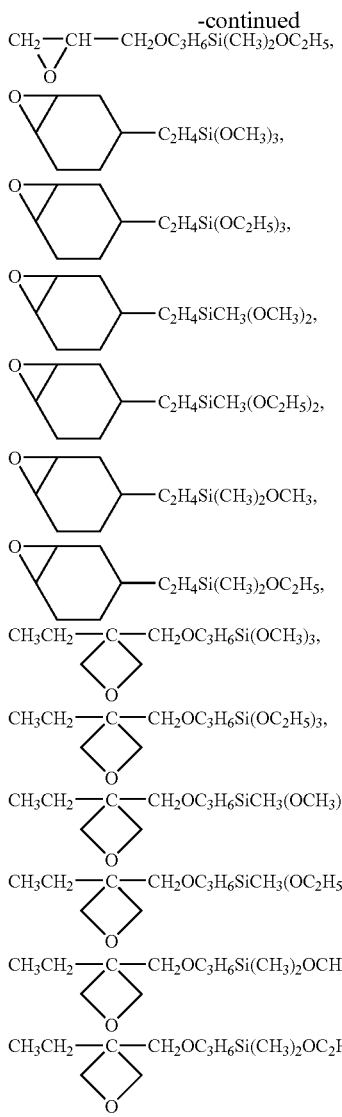

(b) Hydrolyzable Group End-Capped Dimethylsiloxane

The hydrolyzable group end-capped dimethylsiloxane used herein has the general formula (6):

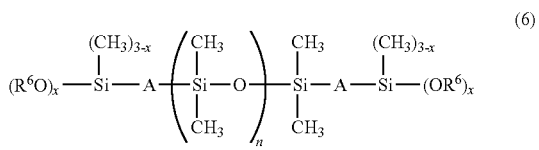
(6)

wherein $R^6$ is H, $CH_3$ or $C_2H_5$, A is O or $C_2H_4$, n is an integer of 5 to 100, and x is an integer of 1 to 3. Notably, the term "end-capped" used in connection with siloxanes means that a siloxane is capped with a specified group at each of opposed ends of its molecular chain.

In formula (6), n is an integer of 5 to 100, preferably 5 to 50, and more preferably 5 to 20. If n<5, crack resistance and anti-staining properties are not available. If n>100, abrasion resistance becomes poor.

The preferred dimethylsiloxane (b) has the following formula:

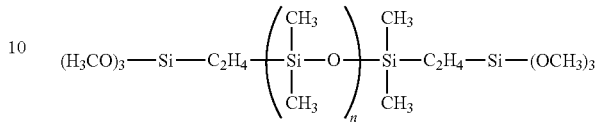

wherein n is as defined above.

An appropriate proportion of component (b) used is 0.01 to 10 parts by weight, more preferably 0.05 to 5 parts by weight per 100 parts by weight of component (a). Less than 0.01 part by weight of component (b) may fail to provide anti-staining property. If component (b) is more than 10 parts by weight, abrasion resistance may lower.

(c) Other Alkoxysilane

In the system of the invention, another alkoxysilane may be added in addition to components (a) and (b) as long as the desired properties are not impaired. Specifically, the other alkoxysilane which can be used herein has the general formula (7):

(7)

wherein $R^7$ is an alkyl group of 1 to 10 carbon atoms, cyclohexyl, phenyl, a perfluoroalkyl-containing organic group of 1 to 20 carbon atoms, or a hexafluoropropene oxide-containing organic group, $R^8$ is an alkyl group of 1 to 4 carbon atoms or an acetyl group, and f is an integer of 0 to 3.

Of the groups represented by $R^7$, examples of the alkyl group of 1 to 10 carbon atoms include methyl, ethyl, propyl, butyl, pentyl and hexyl; examples of the perfluoroalkyl-containing organic group of 1 to 20 carbon atoms include $CF_3C_2H_4$—, $C_4F_9C_2H_4$—, $C_8F_{17}C_2H_4$—, and $C_8F_{17}C_3H_6$—; and examples of the hexafluoropropene oxide-containing organic group include $C_3F_7OC(CF_3)$ $FCF_2OC(CF_3)$ $FCH_2OC_3H_6$—, $C_3F_7OC(CF_3)$ $FCF_2OC$ $(CF_3)$ $FC(=O)NHC_3H_6$—, $F(C(CF_3)FCF_2O)_6C(CF_3)FC$ $(=O)NHC_3H_6$—, $C_3F_7O(C_3F_6O)_mC_2F_4CH_2CH_2$— wherein m=2 to 100, and $(CH_3)_3SiOSi$ $(CH_3)_2C_3H_6OCH_2CF_2$ $(OC_2F_4)_p(OCF_2)_qOCF_2CH_2OC_3H_6$— wherein p, q=2 to 100. Examples of $R^8$ are as exemplified for $R^1$ to $R^5$.

Examples of the other alkoxysilanes include those suited for improving abrasion resistance such as $Si(OCH_3)_4$, $Si(OC_2H_5)_4$, $CH_3Si(OCH_3)_3$, $CH_3Si(OC_2H_5)_3$; those suited for improving crack resistance such as $(CH_3)_2Si$ $(OCH_3)_2$, $(CH_3)_2Si(OC_2H_5)_2$, $C_6H_5Si(OCH_3)_3$, $C_6H_5Si$ $(OC_2H_5)_3$, $C_6H_{12}Si(OCH_3)_3$, $C_6H_{12}Si(OC_2H_5)_3$, $(CH_3)_3$ $SiOCH_3$, $(CH_3)_3SiOC_2H_5$; and those suited for improving anti-staining property such as
$C_3H_7Si(OCH_3)_3$, $C_3H_7Si(OC_2H_5)_3$,
$C_6H_{13}Si(OCH_3)_3$, $C_6H_{13}Si(OC_2H_5)_3$,
$C_{10}H_{21}Si(OCH_3)_3$, $C_{10}H_{21}Si(OC_2H_5)_3$,
$CF_3C_2H_4Si(OCH_3)_3$, $CF_3C_2H_4Si(OC_2H_5)_3$,
$C_8F_{17}C_2H_4Si(OCH_3)_3$, $C_8F_{17}C_2H_4Si(OC_2H_5)_3$,
$C_8F_{17}C_3H_6Si(OCH_3)_3$, $C_8F_{17}C_3H_6Si(OC_2H_5)_3$,
$C_3F_7OC(CF_3)FCF_2OC(CF_3)FCH_2OC_3H_6Si (OCH_3)_3$,
$C_3F_7OC(CF_3)FCF_2OC(CF_3)FCH_2OC_3H_6Si(OC_2H_5)_3$,
$C_3F_7OC(CF_3)FCF_2OC(CF_3)FC(=O)NHC_3H_6Si(OCH_3)_3$,
$C_3F_7OC(CF_3)FCF_2OC(CF_3)FC(=O)NHC_3H_6Si(OC_2H_5)_3$,
$F(C(CF_3)FCF_2O)_6C(CF_3)FC(=O)NHC_3H_6Si(OCH_3)_3$,
$F(C(CF_3)FCF_2O)_6C(CF_3)FC(=O)NHC_3H_6Si (OC_2H_5)_3$, $C_3F_7O(C_3F_6O)_{23}C_2F_4CH_2CH_2Si(OCH_3)_3$, $C_3F_7O(C_3F_6O)_{23}C_2F_4CH_2CH_2Si(OC_2H_5)_3$, $(CH_3)_3SiOSi(CH_3)_2C_3H_6OCH_2CF_2(OC_2F_4)_{21}(OCF_2)_{23}OCF_2CH_2OC_3H_6Si(OCH_3)_3$, $(CH_3)_3SiOSi(CH_3)_2C_3H_6OCH_2CF_2(OC_2F_4)_{21}(OCF_2)_{23}OCF_2CH_2OC_3H_6Si(OC_2H_5)_3$.

An appropriate proportion of component (c) used is 0 to 30 parts by weight, more preferably 0 to 20 parts by weight per 100 parts by weight of component (a). If component (c) is more than 30 parts by weight, anti-staining property may not be obtainable. When component (c) is added, at least 1 part by weight is preferably used.

By subjecting the alkoxy group-containing silane compound and siloxane compound, i.e., components (a) and (b) and optional component (c) to hydrolytic condensation in the presence of a basic catalyst and with an amount of water greater than the amount necessary for hydrolytic condensation of all alkoxy groups, there can be obtained a photoreactive group-containing siloxane compound.

Examples of the basic catalyst used herein include sodium hydroxide, potassium hydroxide, ammonia, and tetraalkylammonium hydroxides. Inter alia, tetraalkylammonium hydroxides are preferred. The basic catalyst is preferably used in an amount of 0.1 to 20% by weight, more preferably 1 to 10% by weight, based on the weight of the silane and siloxane compounds combined.

The amount of water used for hydrolytic condensation should be greater than the amount necessary for hydrolytic condensation of all alkoxy groups available from the silane and siloxane compounds used. Specifically the amount is 0.55 to 10 moles of water, preferably 0.6 to 5 moles of water per mole of alkoxy groups in the system. With less than 0.55 mole, hydrolysis of alkoxy groups may not proceed. With more than 10 moles, condensation may not proceed. In either case, unreacted dimethylsiloxane is left so that a coating may develop cissing and other defectives on the surface.

The hydrolytic condensation reaction should be carried out in an alcohol. Examples of the alcohol used herein include methanol, ethanol, n-propanol, isopropanol, n-butanol, isobutanol, and t-butanol.

The silane compound(s), siloxane compound, alcohol, and basic catalyst, described above, are combined to form a reaction system, to which water is added for hydrolytic condensation to take place. At this point, the reaction temperature is 0° C. to 200° C., and preferably 0° C. to 50° C.

At the end of hydrolytic condensation, the system is made neutral by neutralizing with an acid or washing with water, and the alcohol and the like are distilled off. There is obtained a photoreactive group-containing siloxane compound which is highly stable despite the substantial absence of solvent.

The photoreactive group-containing siloxane compound thus obtained preferably has a weight average molecular weight (Mw) equal to or less than 5,000 and more preferably 1,500 to 4,000. If Mw<1,500, it indicates short condensation and poor shelf stability, and unreacted dimethylsiloxane is left so that a coating may develop cissing and other defectives on the surface. A siloxane compound with Mw>5,000 may have a higher viscosity and become difficult to handle.

The photoreactive group-containing siloxane compound thus obtained preferably has a silanol content equal to or less than 2% by weight, and more preferably equal to or less than 1% by weight. A silanol content of more than 2% by weight may give rise to problems like shelf instability.

Composition

The photoreactive group-containing siloxane compound may be combined with a curing catalyst to formulate a photo-curable resin composition, that is, a resin composition which cures upon exposure to light.

Suitable curing catalysts used herein include radical initiators and cationic catalysts. The radical initiator may be selected from ordinary initiators such as acetophenone, benzoin, benzophenone, and thioxanthone compounds. They are commercially available under the trade name of Darocure 1173, Irgacure 651, Irgacure 184, and Irgacure 907 from Ciba Specialty Chemicals.

Preferred cationic catalysts are onium salt photo-initiators including diaryliodonium salts, triarylsulfonium salts, monoaryldialkylsulfonium salts, triarylselenonium, tetraarylphosphonium salts and aryldiazonium salts as represented by the general formulae: $R^9{}_2I^+X^-$, $R^9{}_3S^+X^-$, $R^9{}_2R^{10}S^+X^-$, $R^9R^{10}{}_2S^+X^-$, $R^9{}_3Se^+ X^-$, $R^9{}_4P^+X^-$, and $R^9N_2{}^+X^-$ wherein $R^9$ is an aryl group of 6 to 30 carbon atoms, $R^{10}$ is an alkyl group of 1 to 30 carbon atoms, and $X^-$ is an anion such as $SbF_6{}^-$, $AsF_6{}^-$, $PF_6{}^-$, $BF_4{}^-$, $B(C_6F_5)_4{}^-$, $HSO_4{}^-$, $ClO_4{}^-$, $Cl^-$ or $CF_3SO_3{}^-$.

Preferred from the compatibility aspect are salts of the general formula:

$$R^{11}{}_2I^+X^-$$

wherein $R^{11}$ is —$C_6H_4$—$R^{12}$ wherein $R^{12}$ is an alkyl group of at least 6 carbon atoms, preferably 6 to 24 carbon atoms, more preferably 6 to 18 carbon atoms. Examples of the alkyl group of at least 6 carbon atoms represented by $R^{12}$ include $C_6H_{13}$, $C_7H_{15}$, $C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, and $C_{18}H_{37}$, with $C_{12}H_{25}$ being most preferred.

The curing catalyst may be used in an amount of 0.1 to 15 parts by weight per 100 parts by weight of the photoreactive group-containing siloxane compound. The preferred amount is 0.5 to 10 parts by weight. With less than 0.1 part by weight of the catalyst, the composition may be less curable. With more than 15 parts by weight of the catalyst, surface hardness may become low.

It is acceptable that the photo-curable resin composition further comprise polyfunctional (meth)acrylates, microparticulate metal oxides, silane coupling agents, non-polymerizable diluent solvents, polymerization inhibitors, antioxidants, UV absorbers, photo-stabilizers, anti-foaming agents, leveling agents or the like, if necessary.

The polyfunctional (meth)acrylate is a main ingredient of a curable component and forms a matrix of a coating after curing. Suitable polyfunctional (meth)acrylates are those compounds having at least two (meth)acrylic groups in a molecule, such as 1,6-hexanediol di(meth)acrylate, triethylene glycol di(meth)acrylate, ethylene oxide-modified bisphenol A di(meth)acrylate, trimethylolpropane tri(meth)acrylate, pentaerythritol tetra(meth)acrylate, ditrimethylolpropane tetra(meth)acrylate, dipentaerythritol hexa(meth)acrylate, pentaerythritol tri(meth)acrylate, 3-(meth)acryloyloxyglycerin mono(meth)acrylate, urethane acrylates, epoxy acrylates, and ester acrylates, but are not limited thereto. These compounds may be used alone or in admixture of two or more.

Suitable microparticulate metal oxides include oxides of Si, Ti, Al, Zn, Zr, In, Sn, and Sb and composite oxides thereof in microparticulate form. Fine particles surface coated with silica or alumina may also be used. Examples of the microparticulate metal oxides include silica, alumina, zirconia and titania fine particles, with the silica fine particles being preferred. The addition of microparticulate metal oxide enhances such properties as abrasion resistance. Silica fine particles may be hollow or porous fine particles which are expected to be effective in reducing refractive index and so forth. Of the silica fine particles, those particles surface modified with a hydrolyzable silane compound having an actinic radiation-sensitive group are preferred. Such reactive silica fine particles undergo crosslinking reaction upon receipt of actinic radiation irradiated in curing the hard coat, whereby they are bound within the polymer matrix.

The photo-curable resin composition of the invention is applied to a surface of an article which must be provided with an anti-staining layer on the surface, and cured to form a hard coat thereon. For example, the composition is applied to a surface, specifically the writing or reading beam incident side surface, of optical data media such as read-only optical discs, optical recording discs, and magneto-optical recording discs, a surface of optical lens, optical filters, and antireflective coatings, and a surface of various display members such as liquid crystal displays, CRT displays, plasma displays, and EL displays. The thus cured coating (or hard coat) imparts mar resistance, crack resistance, an anti-staining effect with respect to fingerprints and contaminants, and a marker ink wipe-off ability to such surfaces. The article having the cured coating has excellent stain resistance and lubricity as well as mar resistance and abrasion resistance.

A coating of the photo-curable resin composition may be formed by a spin coating technique or the like. The cured coating should preferably have a thickness of 0.1 to 50 μm, more preferably 0.5 to 30 μm. Too thin a coating may be less resistant to abrasion whereas too thick a coating may be less resistant to cracking.

The light source used in curing of the photo-curable resin composition is usually selected from light sources capable of emitting radiation within a wavelength range of 200 to 450 nm, for example, high pressure mercury lamps, extra-high pressure mercury lamps, metal halide lamps, xenon lamps, and carbon arc lamps. The exposure dose is not particularly limited and is preferably in a range of 10 to 5,000 mJ/cm$^2$, more preferably 20 to 1,000 mJ/cm$^2$. The curing time is usually 0.5 second to 2 minutes, preferably 1 second to 1 minute.

EXAMPLE

Examples and Comparative Examples are given below for further illustrating the invention although the invention is not limited thereto.

In Examples, all parts are by weight. The volatile content, refractive index, and OH content were measured according to JIS C2133, JIS K0062, and JIS K0070, respectively. The viscosity was measured at 25° C. by a Brookfield viscometer. The weight average molecular weight (Mw) was measured by gel permeation chromatograph (GPC) HLC-8220 (Tosoh Corp.) using tetrahydrofuran as a solvent.

Marker ink resistance was determined by marking the cured coating with a commercial felt pen, wiping the coating surface with fabric, and visually observing whether ink marks were wiped off.

Stain resistance was determined by measuring a contact angle of water and oleic acid using a contact angle meter CA-X150 (Kyowa Interface Science Co., Ltd.). The larger the contact angle, the better is the stain resistance.

Mar resistance or abrasion resistance was determined by performing an abrasion test on the cured coating using a Taber abrasion tester (abrasion wheel CS-10F, load 500 g, 100 revolutions) according to ASTM D1044, and measuring the haze of the cured coating before and after the abrasion test by a haze meter NDH2000 (Nippon Denshoku Industries Co., Ltd.). A haze change (ΔHaze) is the haze after the abrasion test minus the haze before the abrasion test. The coating has good mar resistance or abrasion resistance when ΔHaze is equal to or less than 15.

Example 1

A reactor was charged with 234.0 parts (1.00 mol) of CH$_2$=CHCOOC$_3$H$_6$Si(OCH$_3$)$_3$, 5.5 parts (0.0054 mol) of a trimethoxy end-capped dimethylsiloxane of the formula:

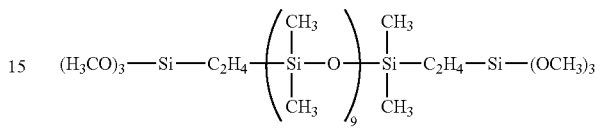

and 681.6 parts of isopropyl alcohol, which were mixed until uniform. To the reactor, 31.2 parts of a 10 wt % methanol solution of tetramethylammonium hydroxide and 108.8 parts (6.04 mol) of water corresponding to a 2-fold molar amount relative to alkoxy groups were added, and the contents were agitated for 12 hours at 25° C. The reaction mixture was made neutral by combining with toluene and washing with water, after which methanol, toluene and the like were distilled off.

The reaction product thus obtained had a volatile content of 0.6%, a viscosity of 89,000 mPa-s, a refractive index of 1.4790, an OH content of 0.3 wt %, and a Mw of 3,000. On analysis by IR absorption and nuclear magnetic resonance (NMR) spectroscopy, it was found that ideal hydrolytic condensation had taken place, and the reaction product was identified as a siloxane compound having an acrylic group.

A composition was prepared by mixing 100 parts of the compound with 5 parts of Darocure 1173 (radical initiator, Ciba Specialty Chemicals), coated on polycarbonate to a thickness of 5 μm, and exposed for 2 seconds using a 80-W high pressure mercury lamp (integral exposure 200 mJ/cm$^2$), whereby the coating was cured.

The cured coating passed the marker ink test and was fully resistant to stains as demonstrated by a contact angle with water of 95° and a contact angle with oleic acid of 44°. It had good abrasion resistance as demonstrated by ΔHaze of 8 in the Taber abrasion test.

Example 2

A reactor was charged with 320.0 parts (1.00 mol) of an alkoxysilane of the formula:

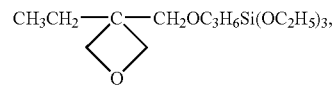

5.5 parts (0.0054 mol) of a trimethoxy end-capped dimethylsiloxane of the formula:

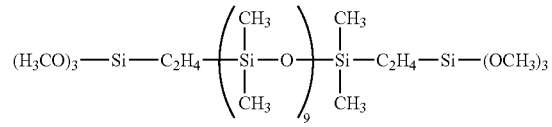

and 869.8 parts of isopropyl alcohol, which were mixed until uniform. To the reactor, 39.2 parts of a 10 wt % methanol solution of tetramethylammonium hydroxide and 108.8 parts (6.04 mol) of water corresponding to a 2-fold molar amount relative to alkoxy groups were added, and the contents were agitated for 12 hours at 25° C. The reaction mixture was made neutral by combining with toluene and washing with water, after which methanol, toluene and the like were distilled off.

The reaction product thus obtained had a volatile content of 0.5%, a viscosity of 78,000 mPa-s, a refractive index of 1.4810, an OH content of 0.3 wt %, and a Mw of 3,200. On analysis by IR absorption and NMR spectroscopy, it was found that ideal hydrolytic condensation had taken place, and the reaction product was identified as a siloxane compound having an acrylic group.

A composition was prepared by mixing 100 parts of the compound with 1 part of $C_{12}H_{25}$—$C_6H_4$—$I^+$—$C_6H_4$—$C_{12}H_{25}SbF_6^-$. It was coated and cured as in Example 1.

The cured coating passed the marker ink test and was fully resistant to stains as demonstrated by a contact angle with water of 91° and a contact angle with oleic acid of 42°. It had good abrasion resistance as demonstrated by ΔHaze of 10 in the Taber abrasion test.

Example 3

A reactor was charged with 227.0 parts (0.97 mol) of $CH_2$=$CHCOOC_3H_6Si(OCH_3)_3$, 17.0 parts (0.03 mol) of $C_8F_{17}C_2H_4Si(OCH_3)_3$, 1.1 parts (0.0011 mol) of a trimethoxy end-capped dimethylsiloxane of the formula:

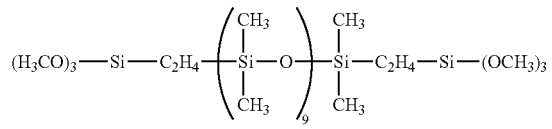

and 715.8 parts of isopropyl alcohol, which were mixed until uniform. To the reactor, 32.3 parts of a 10 wt % methanol solution of tetramethylammonium hydroxide and 108.2 parts (6.01 mol) of water corresponding to a 2-fold molar amount relative to alkoxy groups were added, and the contents were agitated for 12 hours at 25° C. The reaction mixture was made neutral by combining with toluene and washing with water, after which methanol, toluene and the like were distilled off.

The reaction product thus obtained had a volatile content of 0.6%, a viscosity of 72,000 mPa-s, a refractive index of 1.4690, an OH content of 0.4 wt %, and a Mw of 3,400. On analysis by IR absorption and NMR spectroscopy, it was found that ideal hydrolytic condensation had taken place, and the reaction product was identified as a siloxane compound having an acrylic group.

A composition was prepared by mixing 100 parts of the compound with 5 parts of Darocure 1173 (radical initiator, Ciba Specialty Chemicals). It was coated and cured as in Example 1.

The cured coating passed the marker ink test and was fully resistant to stains as demonstrated by a contact angle with water of 105° and a contact angle with oleic acid of 66°. It had good abrasion resistance as demonstrated by ΔHaze of 11 in the Taber abrasion test.

Example 4

A reactor was charged with 227.0 parts (0.97 mol) of $CH_2$=$CHCOOC_3H_6Si(OCH_3)_3$, 40.0 parts (0.03 mol) of $F(C(CF_3)FCF_2O)_6C(CF_3)FC(=O)NHC_3H_6Si(OCH_3)_3$, 0.9 parts (0.0008 mol) of a trimethoxy end-capped dimethylsiloxane of the formula:

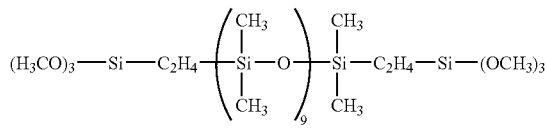

and 828.8 parts of isopropyl alcohol, which were mixed until uniform. To the reactor, 36.5 parts of a 10 wt % methanol solution of tetramethylammonium hydroxide and 108.2 parts (6.01 mol) of water corresponding to a 2-fold molar amount relative to alkoxy groups were added, and the contents were agitated for 12 hours at 25° C. The reaction mixture was made neutral by combining with toluene and washing with water, after which methanol, toluene and the like were distilled off.

The reaction product thus obtained had a volatile content of 0.9%, a viscosity of 88,000 mPa-s, a refractive index of 1.4631, an OH content of 0.5 wt %, and a Mw of 3,100. On analysis by IR absorption and NMR spectroscopy, it was found that ideal hydrolytic condensation had taken place, and the reaction product was identified as a siloxane compound having an acrylic group.

A composition was prepared by mixing 100 parts of the compound with 5 parts of Darocure 1173 (radical initiator, Ciba Specialty Chemicals). It was coated and cured as in Example 1.

The cured coating passed the marker ink test and was fully resistant to stains as demonstrated by a contact angle with water of 109° and a contact angle with oleic acid of 71°. It had good abrasion resistance as demonstrated by ΔHaze of 12 in the Taber abrasion test.

Example 5

A reactor was charged with 227.0 parts (0.97 mol) of $CH_2$=$CHCOOC_3H_6Si(OCH_3)_3$, 8.6 parts (0.015 mol) of $C_8F_{17}C_2H_4Si(OCH_3)_3$, 20.0 parts (0.015 mol) of $F(C(CF_3)FCF_2O)_6C(CF_3)FC(=O)NHC_3H_6Si(OCH_3)_3$, 0.9 parts (0.0008 mol) of a trimethoxy end-capped dimethylsiloxane of the formula:

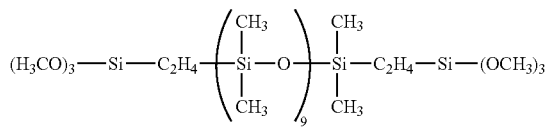

and 771.0 parts of isopropyl alcohol, which were mixed until uniform. To the reactor, 34.0 parts of a 10 wt % methanol solution of tetramethylammonium hydroxide and 108.2 parts (6.01 mol) of water corresponding to a 2-fold molar amount relative to alkoxy groups were added, and the contents were agitated for 12 hours at 25° C. The reaction mixture was made neutral by combining with toluene and washing with water, after which methanol, toluene and the like were distilled off.

The reaction product thus obtained had a volatile content of 0.8%, a viscosity of 81,000 mPa-s, a refractive index of 1.4661, an OH content of 0.5 wt %, and a Mw of 3,500. On analysis by IR absorption and NMR spectroscopy, it was found that ideal hydrolytic condensation had taken place, and the reaction product was identified as a siloxane compound having an acrylic group.

A composition was prepared by mixing 100 parts of the compound with 5 parts of Darocure 1173 (radical initiator, Ciba Specialty Chemicals). It was coated and cured as in Example 1.

The cured coating passed the marker ink test and was fully resistant to stains as demonstrated by a contact angle with water of 107° and a contact angle with oleic acid of 69°. It had good abrasion resistance as demonstrated by ΔHaze of 14 in the Taber abrasion test.

Comparative Example 1

A reactor was charged with 234.0 parts (1.00 mol) of $CH_2\!=\!CHCOOC_3H_6Si(OCH_3)_3$ and 658.9 parts of isopropyl alcohol, which were mixed until uniform. To the reactor, 30.3 parts of a 10 wt % methanol solution of tetramethylammonium hydroxide and 108.0 parts (6.00 mol) of water corresponding to a 2-fold molar amount relative to alkoxy groups were added, and the contents were agitated for 12 hours at 25° C. The reaction mixture was made neutral by combining with toluene and washing with water, after which methanol, toluene and the like were distilled off.

The reaction product thus obtained had a volatile content of 0.7%, a viscosity of 71,000 mPa-s, a refractive index of 1.4815, an OH content of 0.3 wt %, and a Mw of 3,300. On analysis by IR absorption and NMR spectroscopy, it was found that ideal hydrolytic condensation had taken place, and the reaction product was identified as a siloxane compound having an acrylic group.

A composition was prepared by mixing 100 parts of the compound with 5 parts of Darocure 1173 (radical initiator, Ciba Specialty Chemicals). It was coated and cured as in Example 1.

The cured coating had good abrasion resistance as demonstrated by ΔHaze of 10 in the Taber abrasion test, but failed in the marker ink test. It was not resistant to stains as demonstrated by a contact angle with water of 810 and an unmeasurable contact angle with oleic acid.

Comparative Example 2

A reactor was charged with 227.0 parts (0.97 mol) of $CH_2\!=\!CHCOOC_3H_6Si(OCH_3)_3$, 17.0 parts (0.03 mol) of $C_8F_{17}C_2H_4Si(OCH_3)_3$, and 711.3 parts of isopropyl alcohol, which were mixed until uniform. To the reactor, 32.1 parts of a 10 wt % methanol solution of tetramethylammonium hydroxide and 108.0 parts (6.00 mol) of water corresponding to a 2-fold molar amount relative to alkoxy groups were added, and the contents were agitated for 12 hours at 25° C. The reaction mixture was made neutral by combining with toluene and washing with water, after which methanol, toluene and the like were distilled off.

The reaction product thus obtained had a volatile content of 0.7%, a viscosity of 10,700 mPa-s, a refractive index of 1.4700, an OH content of 0.5 wt %, and a Mw of 2,800. On analysis by IR absorption and NMR spectroscopy, it was found that ideal hydrolytic condensation had taken place, and the reaction product was identified as a siloxane compound having an acrylic group.

A composition was prepared by mixing 100 parts of the compound with 5 parts of Darocure 1173 (radical initiator, Ciba Specialty Chemicals). It was coated and cured as in Example 1.

The cured coating exhibited high values of contact angle, i.e., a contact angle with water of 101° and a contact angle with oleic acid of 62°, but was not resistant to stains as demonstrated by a failure in the marker ink test. Abrasion resistance was fairly low as demonstrated by ΔHaze of 19 in the Taber abrasion test.

Japanese Patent Application Nos. 2006-114074 and 2006-192436 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a photoreactive group-containing siloxane compound, comprising the steps of subjecting a system comprising
   (a) a photoreactive group-containing alkoxysilane selected from photoreactive group-containing alkoxysilanes having the following general formulae (1) and (2):

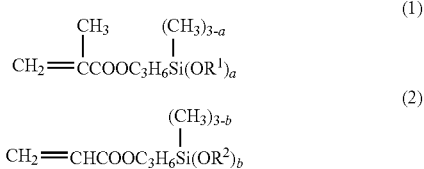

wherein each of $R^1$ to $R^5$ is an alkyl group of 1 to 4 carbon atoms or acetyl group, each of a and b is an integer of 1 to 3, and mixtures thereof, with the proviso that if component (a) is a single alkoxysilane, it is a trialkoxysilane, and if component (a) is a mixture of alkoxysilanes, it contains at least 70 mol % of a trialkoxysilane,
   (b) a hydrolyzable group end-capped dimethylsiloxane having the general formula (6):

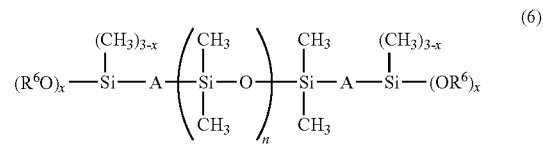

wherein $R^6$ is hydrogen, methyl or ethyl, A is an oxygen atom or ethylene, n is an integer of 5 to 100, and x is an integer of 1 to 3, and
   (d) an alcohol to hydrolytic condensation in the presence of a basic catalyst and with an amount of water greater than the amount necessary for hydrolytic condensation of all alkoxy groups, rendering the resulting system neutral, and distilling off the alcohol.

2. The method of claim 1, wherein said system further comprises (c) another alkoxysilane having the general formula (7):

wherein $R^7$ is an alkyl group of 1 to 10 carbon atoms, cyclohexyl, phenyl, a perfluoroalkyl-containing organic group of 1 to 20 carbon atoms, or a hexafluoropropene oxide-containing organic group, $R^8$ is an alkyl group of 1 to 4 carbon atoms or acetyl group, and f is an integer of 0 to 3.

3. The method of claim 1, wherein component (a) is $CH_2\!=\!CHCOOC_3H_6Si(OCH_3)_3$.

4. The method of claim 1, wherein the basic catalyst is a tetraalkylammonium hydroxide.

5. The photoreactive group-containing siloxane compound which is obtained through hydrolytic condensation of a system comprising (a) a photoreactive group-containing alkoxysilane selected from photoreactive group-containing alkoxysilanes having the following general formulae (1) and (2):

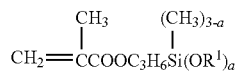 (1)

 (2)

wherein each of $R^1$ to $R^5$ is an alkyl group of 1 to 4 carbon atoms or acetyl group, each of a and b is an integer of 1 to 3, and mixtures thereof, with the proviso that if component (a) is a single alkoxysilane, it is a trialkoxysilane, and if component (a) is a mixture of alkoxysilanes, it contains at least 70 mol% of a trialkoxysilane, and (b) a trimethoxy end-capped dimethylsiloxane having the following formula:

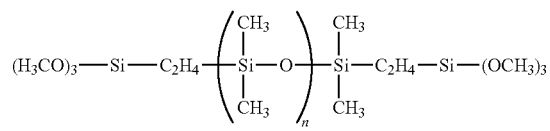

wherein n is an integer of 5 to 100.

6. The photoreactive group-containing siloxane compound of claim 5, which is obtained through hydrolytic condensation of a system comprising, in addition to components (a) and (b), another alkoxysilane having the general formula (7):

 (7)

wherein $R^7$ is an alkyl group of 1 to 10 carbon atoms, cyclohexyl, phenyl, a perfluoroalkyl-containing organic group of 1 to 20 carbon atoms, or a hexafluoropropene oxide-containing organic group, $R^8$ is an alkyl group of 1 to 4 carbon atoms or acetyl group, and f is an integer of 0 to 3, in the presence of a basic catalyst and with an amount of water greater than the amount necessary for hydrolytic condensation of all alkoxy groups.

7. The photoreactive group-containing siloxane compound of claim 5, wherein the basic catalyst is a tetraalkylammonium hydroxide.

8. A photo-curable resin composition comprising the photoreactive group-containing siloxane compound of claim 5 and a curing catalyst.

9. An article comprising a cured coating of the photo-curable resin composition of claim 8.

10. The photoreactive group-containing siloxane compound which is obtained through hydrolytic condensation of a system comprising (a) a photoreactive group-containing alkoxysilane selected from photoreactive group-containing alkoxysilanes having the following general formulae (1) and (2):

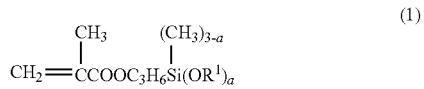 (1)

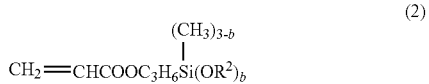 (2)

wherein each of $R^1$ to $R^5$ is an alkyl group of 1 to 4 carbon atoms or acetyl group, each of a and b is an integer of 1 to 3, and mixtures thereof, with the proviso that if component (a) is a single alkoxysilane, it is a trialkoxysilane, and if component (a) is a mixture of alkoxysilanes, it contains at least 70 mol% of a trialkoxysilane, and (b) a hydrolyzable group end-capped dimethylsiloxane having the general formula (6):

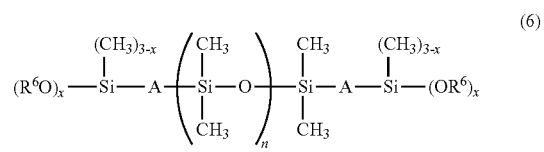 (6)

wherein $R^6$ is hydrogen, methyl or ethyl, A is an oxygen atom or ethylene, n is an integer of at least 5, and x is an integer of 1 to 3, in the presence of a basic catalyst and with an amount of water greater than the amount necessary for hydrolytic condensation of all alkoxy groups, the photoreactive group-containing siloxane compound having a weight average molecular weight equal to or less than 5,000.

11. The photoreactive group-containing siloxane compound of claim 10, which is obtained through hydrolytic condensation of a system comprising, in addition to components (a) and (b), another alkoxysilane having the general formula (7):

 (7)

wherein $R^7$ is an alkyl group of 1 to 10 carbon atoms, cyclohexyl, phenyl, a perfluoroalkyl-containing organic group of 1 to 20 carbon atoms, or a hexafluoropropene oxide-containing organic group, $R^8$ is an alkyl group of 1 to 4 carbon atoms or acetyl group, and f is an integer of 0 to 3, in the presence of a basic catalyst and with an amount of water greater than the amount necessary for hydrolytic condensation of all alkoxy groups.

12. The photoreactive group-containing siloxane compound of claim 10, wherein the basic catalyst is a tetraalkylammonium hydroxide.

13. A photo-curable resin composition comprising the photoreactive group-containing siloxane compound of claim 10 and a curing catalyst.

14. An article comprising a cured coating of the photo-curable resin composition of claim 13.

15. The photoreactive group-containing siloxane compound which is obtained through hydrolytic condensation of a system comprising (a) a photoreactive group-containing alkoxysilane selected from photoreactive group-containing alkoxysilanes having the following general formulae (1) and (2):

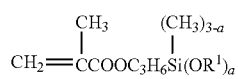

(1)

(2)

wherein each of $R^1$ to $R^5$ is an alkyl group of 1 to 4 carbon atoms or acetyl group, each of a and b is an integer of 1 to 3, and mixtures thereof, with the proviso that if component (a) is a single alkoxysilane, it is a trialkoxysilane, and if component (a) is a mixture of alkoxysilanes, it contains at least 70 mol% of a trialkoxysilane, and (b) a hydrolyzable group end-capped dimethylsiloxane having the general formula (6):

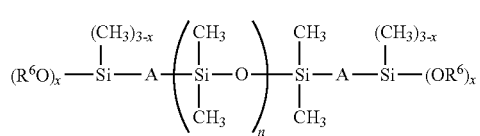

(6)

wherein $R^6$ is hydrogen, methyl or ethyl, A is an oxygen atom or ethylene, n is an integer of 5 to 100, and x is an integer of 1 to 3, in the presence of a basic catalyst and with an amount of water greater than the amount necessary for hydrolytic condensation of all alkoxy groups, the photoreactive group-containing siloxane compound having a silanol content equal to or less than 2% by weight.

16. The photoreactive group-containing siloxane compound of claim 15, which is obtained through hydrolytic condensation of a system comprising, in addition to components (a) and (b), another alkoxysilane having the general formula (7):

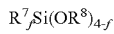

(7)

wherein $R^7$ is an alkyl group of 1 to 10 carbon atoms, cyclohexyl, phenyl, a perfluoroalkyl-containing organic group of 1 to 20 carbon atoms, or a hexafluoropropene oxide-containing organic group, $R^8$ is an alkyl group of 1 to 4 carbon atoms or acetyl group, and f is an integer of 0 to 3, in the presence of a basic catalyst and with an amount of water greater than the amount necessary for hydrolytic condensation of all alkoxy groups.

17. The photoreactive group-containing siloxane compound of claim 15, wherein the basic catalyst is a tetraalkylammonium hydroxide.

18. A photo-curable resin composition comprising the photoreactive group-containing siloxane compound of claim 15 and a curing catalyst.

19. An article comprising a cured coating of the photo-curable resin composition of claim 18.

* * * * *